C. E. N. STORR.
FLOAT CONTROLLED APPARATUS FOR MAINTAINING A CONSTANT LEVEL OF LIQUID.
APPLICATION FILED JAN. 19, 1918.
1,313,029. Patented Aug. 12, 1919.
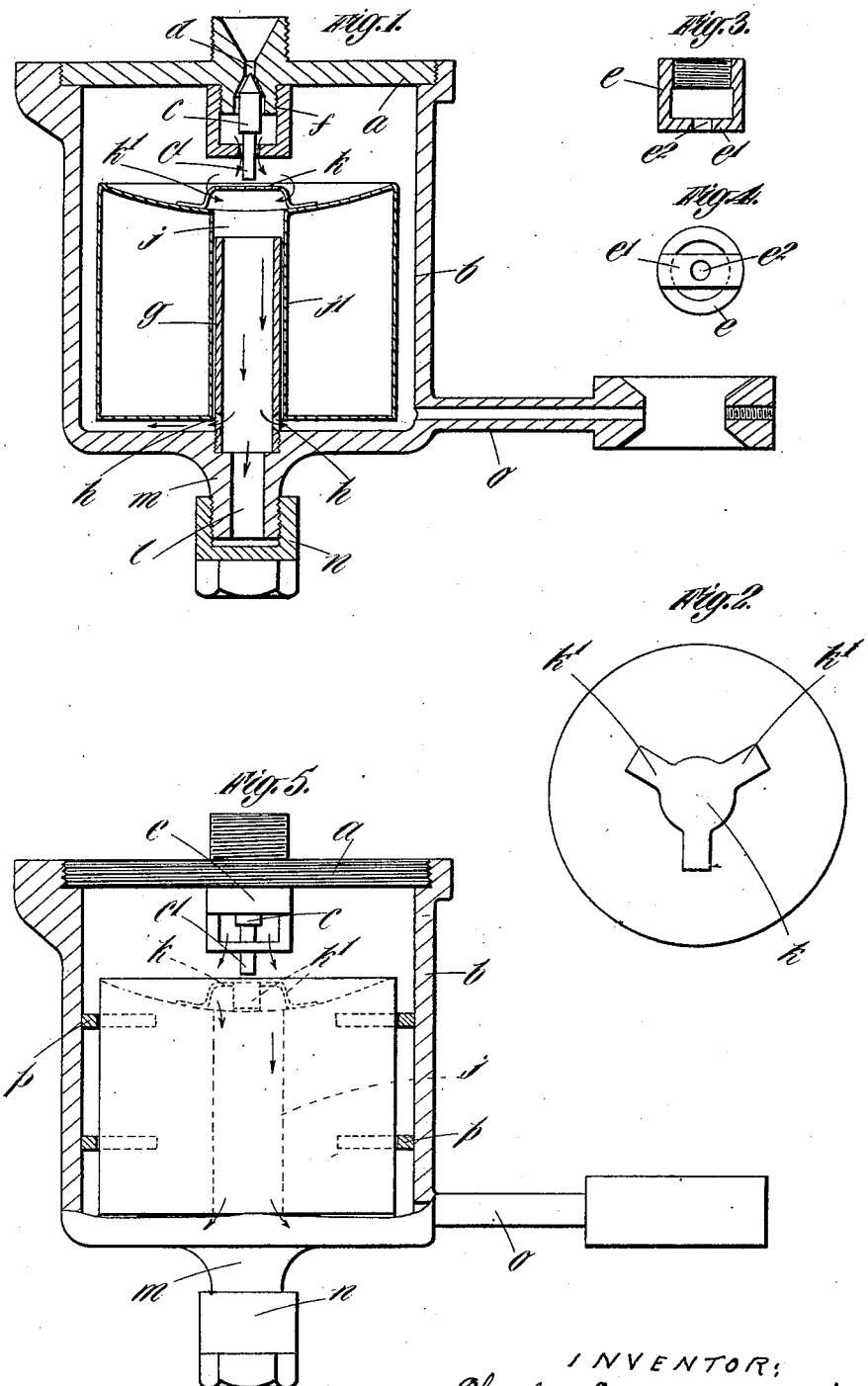
INVENTOR:
Charles Edward Noel Storr
By Wm Wallace White
ATT'Y.

UNITED STATES PATENT OFFICE.

CHARLES EDUARD NOËL STORR, OF LONDON, ENGLAND.

FLOAT-CONTROLLED APPARATUS FOR MAINTAINING A CONSTANT LEVEL OF LIQUID.

1,313,029.    Specification of Letters Patent.    Patented Aug. 12, 1919.

Application filed January 19, 1918. Serial No. 212,653.

*To all whom it may concern:*

Be it known that I, CHARLES EDUARD NOËL STORR, of 115 Southwark street, London, England, have invented certain new and useful Improvements Relating to Float-Controlled Apparatus for Maintaining a Constant Level of Liquid, of which the following is a specification.

This invention relates to float-controlled apparatus for maintaining a constant level of liquid. The invention applies in particular to constant level float chambers for use with carbureters of internal combustion engines, but it can be employed in other cases in which a constant level of liquid is to be maintained under the control of a float working in a chamber and serving to close the flow of liquid into said chamber when the liquid attains the given level therein and to open the supply when the level falls.

Float controlled apparatus for carbureters have been proposed in which the liquid from an admission pipe or inlet above is delivered down through the float so as to be delivered below the float in the float chamber instead of above the same, the float being guided by a tubular guide depending into or through a hole extending down through the float, and the fuel from the inlet passing down through the space between the tubular guide and a needle valve likewise extending down through the float and operated by the float in its rise and fall. In such apparatus a passage of only a small or restricted area is permitted for the passage of the liquid through the float between the tubular guide and the valve extending thereinto as mentioned.

The present invention aims to provide simple and efficient float controlled apparatus in which a free passage of considerable area is provided for the flow of the liquid through the float to the delivery at the bottom, thus correspondingly accelerating the delivery and the action of the liquid in raising the float and counterbalancing the tendency of the liquid entering at top to hold the float down.

According to my invention the float formed with a tubular passage extending down through it, slides by means of said passage on the outside of a tubular guide projecting up from the bottom of the float chamber, or is guided by means external to said passage, the valve controlling the liquid inlet to the float chamber and situated above the float being operated by a member at the upper part of the float. Thus in either case a clear passage of considerable area is provided for the liquid through the float to the outlet below the same.

Instead of one liquid passage a plurality of same may evidently be provided through the float.

As illustration of the invention I will describe by way of example with the aid of the accompanying drawings, two forms of constant level apparatus constructed in accordance with the invention for use with carbureters of internal combustion engines.

In the drawings, Figure 1 is a vertical mid-section through a carbureter float chamber and the float and petrol admission valve thereof.

Fig. 2 is a plan of the float; Fig. 3 is a vertical mid-section of the guide nipple of the petrol valve and Fig. 4 an under plan thereof.

Fig. 5 is a sectional elevation of a carbureter float chamber illustrating the modified form of the invention in which the float is guided by guides independent of the petrol passage therethrough.

Referring first to Figs. 1 to 4:

In the top or cover $a$ of a constant level vessel $b$ of usual or suitable form is fitted a downwardly opening conical valve $c$ serving to open and close the petrol inlet passage $d$. The stem $c'$ of the valve $c$ depends through a retaining guide shown as constituted by a central hole $e^2$ in the cross piece $e'$ of a nipple $e$ screwed on to a threaded extension $f$ of the cover $a$ the sides of the nipple $e$ being cut away at the lower part of the nipple to leave the cross piece $e'$ and permit the petrol to flow past the sides of same from the interior of the nipple. In line with the valve an open-topped vertical guide tube $g$ projects up centrally from the bottom of the vessel $b$, this tube being formed with one or more lateral holes $h$ near the bottom. A float $i$ of cylindrical or other suitable shape is constructed with a large central hole $j$ formed by a tube $j'$ extending through it, so as to slide on the guide tube $g$ and allow the liquid admitted by the valve $c$ to pass down the guide tube $g$ and issue through the lateral hole or holes $h$ therein below the float. On the top of the float is provided a table of any suitable form to come against and lift the valve stem in the rise of the float, so as to close the valve c. This table may as shown be in the form of a disk or strip of metal k attached to the top of the float by downwardly bent arms k' or otherwise so as to permit the liquid from the valve to pass through the hole j in the float to the guide tube g.

At the bottom of the guide tube a sump l may be provided in the base of the vessel to receive sediment. This sump may be formed by a tubulure m on the bottom of the vessel closed by a screw-on cap n. o is the usual outlet pipe or conduit leading from near the bottom of the vessel.

Referring now to Fig. 5, the construction shown is similar in action to that of Figs. 1 to 4, but in this case guide tube g is omitted and the float is guided in its rise and fall by external guides p provided on the wall of the float chamber, the petrol admitted by the valve c operated by the table k passing down through the central hole or passage j' of the float and issuing at the bottom thereof to exert the same action as above described. Otherwise the construction shown in Fig. 5 is the same as that of Figs. 1 to 4.

In either case it will be seen that a free passage of considerable area is provided for the liquid through the float.

In operation the liquid entering the chamber past the valve c is conducted down the float passage j through guide tube g (Fig. 1) or through the clear float passage j' (Fig. 5) to the bottom of the float chamber and spreads out through the hole or holes h in the guide tube (Fig. 1) or the bottom of the passage j' (Fig. 5.)

The invention enables the level to be maintained constant to a reliable degree and permits of rapidity of response to any demand on the outlet side of the chamber.

It also allows of increase in the outlet capacity capable of being dealt with by a float of given size, or reduction in the weight and size of chamber of float for a given capacity.

The apparatus can be cheaply constructed owing to its simplicity and the moving parts can be light.

It is to be understood that the particular forms shown in the drawings are given only by way of example and that the construction may be varied within the spirit of the invention.

The valve may be of the ball or other type instead of a conical valve.

What I claim and desire to secure by Letters Patent is:—

1. An apparatus of the character described comprising a vessel having a centrally disposed inlet opening in the top wall thereof, a tubular guide member fixed to the lower wall of the vessel directly below said inlet opening, a float formed with a bore to receive said member and slidably mounted thereon, a table fixed to said float and spanning the upper end of said bore, a U-shaped valve yoke depending from the top of said vessel and disposed axially of said inlet opening, a valve controlling said inlet opening, and a valve stem on said valve, said stem being slidable through said yoke and engageable with said table.

2. An apparatus of the character described comprising a vessel having a centrally disposed inlet in the top wall thereof, a float mounted for vertical movement in said vessel and having a vertically extending bore disposed in vertical alinement with said inlet opening, the upper wall of said float being concave, a valve controlling said inlet opening and means carried by said float for actuating said valve.

3. An apparatus of the character described comprising a vessel having an inlet opening in the top wall thereof, a tubular guide upstanding in said vessel and disposed directly below said inlet opening, the lower wall of the vessel being formed with an opening directly below said guide, a sediment receiving member below said opening, a float surrounding said guide and slidable vertically thereon, a valve controlling said inlet opening, and means carried by said float for actuating said valve, said guide being formed with outlet openings at a point below said float for the purpose described.

4. An apparatus of the character described comprising a vessel having an inlet opening in the top wall thereof, a tubular guide upstanding in said vessel and disposed directly below said inlet opening, a float surrounding said guide and slidable vertically thereon, a valve controlling said inlet opening, and means carried by said float for actuating said valve, said guide being formed with outlet openings at a point below said float, and said float being formed with a concave top.

In testimony whereof I have signed my name to this specification.

CHARLES EDUARD NOËL STORR.

Copies of this patent may be obtained for five cents each, by addressing the "Commissioner of Patents, Washington, D. C."